United States Patent [19]

Bartlett et al.

[11] Patent Number: 5,176,741
[45] Date of Patent: Jan. 5, 1993

[54] PRODUCING TITANIUM PARTICULATES FROM IN SITU TITANIUM-ZINC INTERMETALLIC

[75] Inventors: Robert W. Bartlett; Lee S. Richardson; Kay D. Bowles; James J. Hemenway, all of Moscow, Id.

[73] Assignee: Idaho Research Foundation, Inc., Moscow, Id.

[21] Appl. No.: 595,974

[22] Filed: Oct. 11, 1990

[51] Int. Cl.$^5$ .................................... B22F 9/00
[52] U.S. Cl. .................................... 75/360; 75/338; 75/359; 423/85
[58] Field of Search .................... 75/338, 360, 359; 423/85

[56] References Cited

U.S. PATENT DOCUMENTS

| | | | |
|---|---|---|---|
| 4,359,449 | 11/1982 | Hard et al. | 423/85 |
| 4,390,365 | 6/1983 | Hard et al. | 423/84 |
| 4,468,248 | 8/1984 | Megy | 75/84 |
| 4,470,847 | 9/1984 | Hard et al. | 423/84.4 |
| 4,595,413 | 6/1986 | Hard et al. | 75/251 |
| 4,602,947 | 7/1986 | McClincy et al. | 75/338 |
| 4,655,825 | 4/1987 | Hard et al. | 75/360 |

Primary Examiner—Upendra Roy
Attorney, Agent, or Firm—Klarquist, Sparkman, Campbell, Leigh & Whinston

[57] ABSTRACT

A process for producing salt free titanium powder by reacting zinc and a titanium halide in the presence of a reducing agent to form a solid zinc titanium product. Titanium halide vapor is introduced into a liquid alloy of zinc and the reducing agent at a temperature between 650°–907° C. The titanium halide is introduced beyond the titanium solubility limit in zinc to precipitate a zinc titanium intermetallic compound and also produce a liquid halide salt. The intermetallic compound forms and accumulates at an interface between the salt and liquid alloy. The compound is periodically removed from the interface, crushed into a powder, and the zinc is evaporatively separated from the titanium to produce pure titanium powder. The process preferably occurs above the peritectic decomposition temperature of $Zn_3Ti$, and most preferably above the peritectic decomposition temperature of $Zn_2Ti$, to maximize the titanium content of the resulting product.

40 Claims, 2 Drawing Sheets

PRODUCING TITANIUM PARTICULATES FROM IN SITU TITANIUM-ZINC INTERMETALLIC

FIELD OF THE INVENTION

This invention concerns a process for the preparation of titanium from titanium halides, such as titanium tetrachloride. This invention further relates to production of finely divided particulate titanium and titanium alloys from titanium tetrachloride.

BACKGROUND OF THE INVENTION

Many diversified applications have been found for titanium and its alloys. Titanium metal has been essential to the aerospace industry since the early 1950's because it combines a high-strength to weight ratio with the ability to perform at much higher temperatures than aluminum or magnesium. It has therefore been used in compressor blades, turbine disks, and many other forged parts of jet engines and aircraft frames. It is also widely employed in the chemical processing industry because of its excellent resistance to chloride corrosion. Because of its scarcity and high cost, titanium has frequently been used in the form of a titanium powder to produce articles which are too expensive or difficult to produce by machining or forging from massive metal shapes. More efficient processes for the production of titanium powder have therefore been sought.

A majority of the world's titanium is made by the Kroll process, which produces titanium "sponge" in the form of a metallic powder. The titanium sponge is produced by reducing titanium tetrachloride ($TiCl_4$) with magnesium or sodium in a heated steel vessel. After cooling, an intimate mixture of titanium sponge and frozen chloride salt forms. The sponge and salt are separated by crushing and water leaching the products to dissolve the salt and produce a purer titanium product. The titanium sponge is then compressed into an electrode bar and vacuum arc remelted (VAR) to consolidate the metallic sponge. The expensive VAR process must be repeated once and sometimes twice to remove residual chloride salt and produce a clean consolidated bar of titanium. Alloying agents may be introduced during resulting if special purpose titanium alloys are desired.

The most important consideration for any process of making titanium is to prevent contamination with either metallic or non-metallic impurities, because even small amounts of some impurities can make the product brittle and unworkable. This is an especially serious problem for aerospace and other critical applications where such impurities can lead to defects in the final product manufactured from titanium. It is crucial, for example, that titanium components of jet engines or guided missiles maintain their structural integrity at all times in stressful environments. To help preserve this integrity, many processes have been developed for producing titanium powder free of contaminants which impair the structural integrity of the end product.

U.S. Pat. No. 4,602,947, for example, discloses a method of producing titanium sponge or titanium alloy powder by reducing gaseous titanium tetrachloride with magnesium. This method, which is schematically summarized in FIG. 2, produces titanium metal in the form of finely divided particles by first forming a liquid mixture of titanium and zinc, then solidifying the liquid mixture to produce finely divided alloy particles, and finally evaporatively separating zinc from the particles to produce pure titanium powder. In particularly disclosed embodiments, titanium chloride vapor is injected into a molten zinc-magnesium bath. Titanium replaces magnesium in the liquid alloy such that liquid zinc titanium and liquid magnesium chloride are produced. The less dense liquid magnesium chloride. which is completely immiscible with the liquid zinc titanium alloy, floats to the top of the reactor where it is removed. The resulting liquid zinc titanium mixture is recovered, solidified, and passed to a zinc evaporation zone where the zinc is sublimed to produce sponge titanium.

Although the process disclosed in U.S. Pat. No. 4,602,947 produces a relatively pure titanium sponge product, it suffers from the expensive drawback of requiring large amounts of zinc. Titanium has a very low solubility in zinc at temperatures up to the normal boiling point of zinc (907° C.). As a practical matter, the titanium solubility in liquid zinc is limited to about five weight percent. This is shown by the zinc rich end of the zinc titanium binary phase diagram reproduced in FIG. 1. This low solubility is significant because the solubility limit cannot be exceeded if a liquid mixture of titanium and zinc is desired. Such a liquid mixture is required in the '947 patent, and because of the limited titanium solubility, approximately 20 lbs. of zinc must be consumed for each pound of titanium produced. A substantial amount of zinc is also lost through evaporation at the elevated temperatures preferred in that prior process. Although a cover of molten salt theoretically prevents zinc evaporation up to its boiling point at the gas over-pressure (usually one atmosphere or less), as a practical matter it is usually necessary to operate at temperatures over 907° C. to increase the solubility of titanium in zinc. The zinc evaporates at this temperature and is lost from the reaction.

Other United States patents disclose methods for producing titanium sponge by reducing titanium chloride salts with aluminum. See, for example, U.S. Pat. Nos. 4,359,449; U.S. Pat. No. 4,390,365; and U.S. Pat. No. 4,468,248. None of these patents disclose reduction of gaseous titanium chloride by magnesium in a liquid zinc alloy. Other U.S. patents teach producing titanium powder and titanium alloy powder from binary and more complex zinc-titanium alloys by removing the zinc through sublimation. Such patents include U.S. Pat. No. 4,470,847; U.S. Pat. No. 4,595,413; and U.S. Pat. No. 4,655,825. Removal of zinc from zinc titanium alloys is also taught in U.S. Pat. No. 4,602,947.

SUMMARY OF THE INVENTION

The present invention overcomes the drawback of U.S. Pat. No. 4,602,947 by contradicting the teaching of that patent that a liquid mixture of titanium and zinc is desired in producing titanium powder. In the present invention, zinc and a titanium halide are reacted in the presence of a reducing agent to form a solid zinc titanium product. The solid product is obtained by introducing titanium halide vapor into a liquid alloy of zinc and a reducing metal in amounts beyond the solubility limit of titanium metal in zinc to precipitate zinc titanium intermetallic compounds. The reaction also produces a lower density salt comprised of the reducing metal and halide, which is immiscible with the liquid alloy and floats to the top of the reaction mixture. The zinc titanium intermetallic compounds form and accumulate at the interface between the salt and liquid alloy layers. The zinc titanium compounds are removed from the interface, crushed, and the zinc evaporatively separated to produce pure titanium sponge.

In more specific embodiments, titanium tetrachloride vapor is injected into a liquid alloy of zinc and magnesium at temperatures above 650° C. but below the zinc boiling temperature of 907° C. Titanium tetrachloride injection is continued well beyond the titanium solubility limit to precipitate a zinc titanium product which includes intermetallic compounds. Zinc rich intermetallic compounds such as $Zn_3Ti$ or $Zn_4Ti$ are unstable above 650° C. and decompose peritectically to solid $Zn_2Ti$ and $Zn_2Ti$. Even $Zn_2Ti$ is unstable above the peritectic decomposition temperature of $Zn_2Ti$ (about 750° C.), and ZnTi will be the sole product of the reaction above this temperature. The titanium content in ZnTi is above 40 weight percent, while the titanium content in $Zn_2Ti$ is about 27 weight percent. In either case, the titanium content is much greater than the liquid solubility limit of about 10–15 atomic percent, and a process producing either of these intermetallic compounds is much more efficient and economic in its use of zinc than previous processes for titanium sponge production. The low reaction temperatures also diminish the amount of zinc lost through evaporation.

In prior art processes, such as that disclosed in U.S. Pat. No. 4,602,947, approximately 20 pounds of zinc are consumed for each pound of titanium produced. The process of the present invention, however, requires only 1.37 pounds of zinc per pound of titanium when the process is performed above the peritectic decomposition temperature of $Zn_2Ti$ (about 750° C.) to produce ZnTi. When the process is carried out between the peritectic temperature of decomposition of $Zn_3Ti$ (650° C.) and $Zn_2Ti$ (about 750° C.), about 2.73 pounds of zinc would be required for each pound of titanium produced. The differing requirements for zinc reflect the changing atomic percent of zinc in the final product. In a commercial process, additional amounts of liquid zinc (saturated in titanium) would be attached to the intermetallic compound dross removed from the furnace, and more zinc would be required than the theoretical amounts given above. The amount of zinc required in the present invention, however, is much less than the amount of zinc needed to produce a liquid alloy that is thereafter frozen and vacuum sublimed as in the prior art.

DETAILED DESCRIPTION OF PREFERRED EMBODIMENTS

Figure 3:
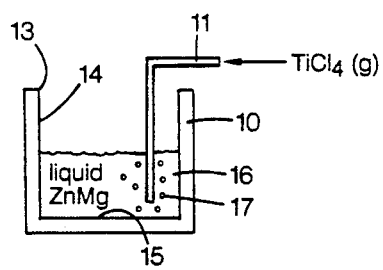
FIG. 3 is a schematic diagram of a reaction vessel in which the process of the present invention can be performed.

A cylindrical carbon crucible or reactor 10 is shown in FIG. 3 into which titanium tetrachloride vapor is introduced through a gas conduit 11. The conduit 11 enters reactor 10 through an open top 13 and extends along a sidewall 14 until conduit 11 terminates adjacent bottom 15. Before the reaction begins, reactor 10 contains a liquid alloy of zinc and a reducing metal in layer 16. In the disclosed embodiment, the reducing metal is magnesium, but it can also be sodium, potassium, lithium, calcium, or mixtures thereof. Magnesium is the preferred reducing metal. The disclosed process operates at one atmosphere pressure, until the zinc vapor pressure increases at higher temperatures.

As $TiCl_4$ is introduced into layer 16 of liquid zinc magnesium alloy, $TiCl_4$ bubbles 17 are formed in the mixture. As the amount of $TiCl_4$ introduced into and reduced to titanium in layer 16 exceeds the solubility limit of titanium in zinc, a zinc-titanium intermetallic dross 18 (FIG. 4) is formed. The dross is the product of a reaction in which titanium displaces magnesium from the zinc to precipitate intermetallic compounds which then concentrate in situ beyond the solubility limit of titanium in zinc. The intermetallic compounds include ZnTi and $Zn_2Ti$, and in preferred embodiments are limited to ZnTi and $Zn_2Ti$, rather than compounds having a higher Zn content. The magnesium liberated from the ZnMg alloy reacts with chlorine liberated from the $TiCl_4$ to produce magnesium chloride ($MgCl_3$) liquid which is immiscible with, and has a lower density than, the layer 16 or dross 18. The magnesium chloride, therefore, forms a liquid layer 20 at the top of the reaction vessel. Dross 18 accumulates at interface 22 between layers 16 and 20.

Figure 4:
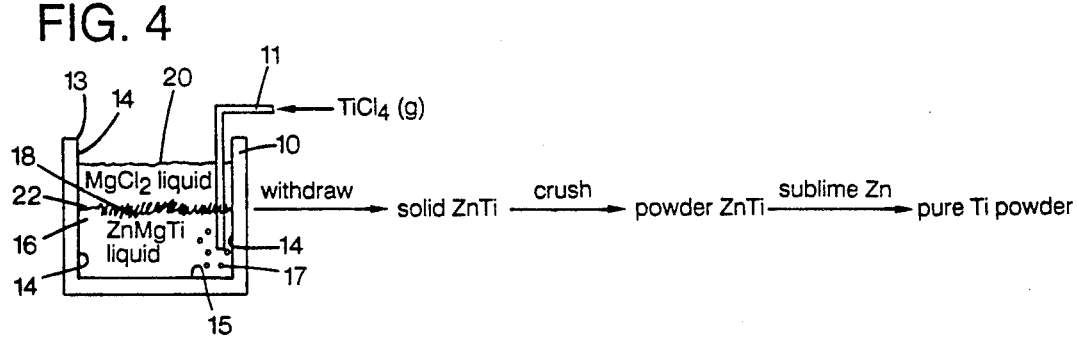
FIG. 4 is a schematic diagram of the reaction vessel of FIG. 3 in which the process of the present invention is occurring, with subsequent steps of the process also shown schematically.

Dross 18 is periodically removed from the crucible, for example, by an inert alloy sieve basket described in connection with FIG. 4 below. The dross is removed from reactor 10 as a solid ZnTi compound, which is crushed to form a powdered ZnTi product that is then heated to remove zinc by sublimation and yield a pure titanium powder. Examples of methods for subliming zinc from binary and more complex zinc titanium alloys are disclosed in U.S. Pat. No. 4,470,847; U.S. Pat. No. 4,595,413; and U.S. Pat. No. 4,655,825.

Zinc and magnesium are continuously or intermittently replenished through an airlock into reactor 10. Accumulating magnesium chloride is removed from layer 20 by a cup, siphon pipette, or overflow weir (not shown) through an airlock. Thus, the process can be quasi-continuous if desired, rather than a batch process. Other methods of replenishing reactants and removing solid and liquid products of the reduction reaction are possible and within the scope of this invention. It would be possible, for example, to continuously add titanium scrap to liquid zinc and allow the titanium to dissolve to its solubility limit, then precipitate out the titanium-zinc intermetallic compound as a dross for removal.

The titanium halide reduction reaction has fast chemical kinetics and is essentially stoichiometric. The reaction between magnesium and titanium tetrachloride produces two moles of magnesium chloride for each mole of titanium tetrachloride injected:

$TiCl_4(g) + 2\ Mg \rightarrow Ti + 2\ MgCl_2$

Figure 5:
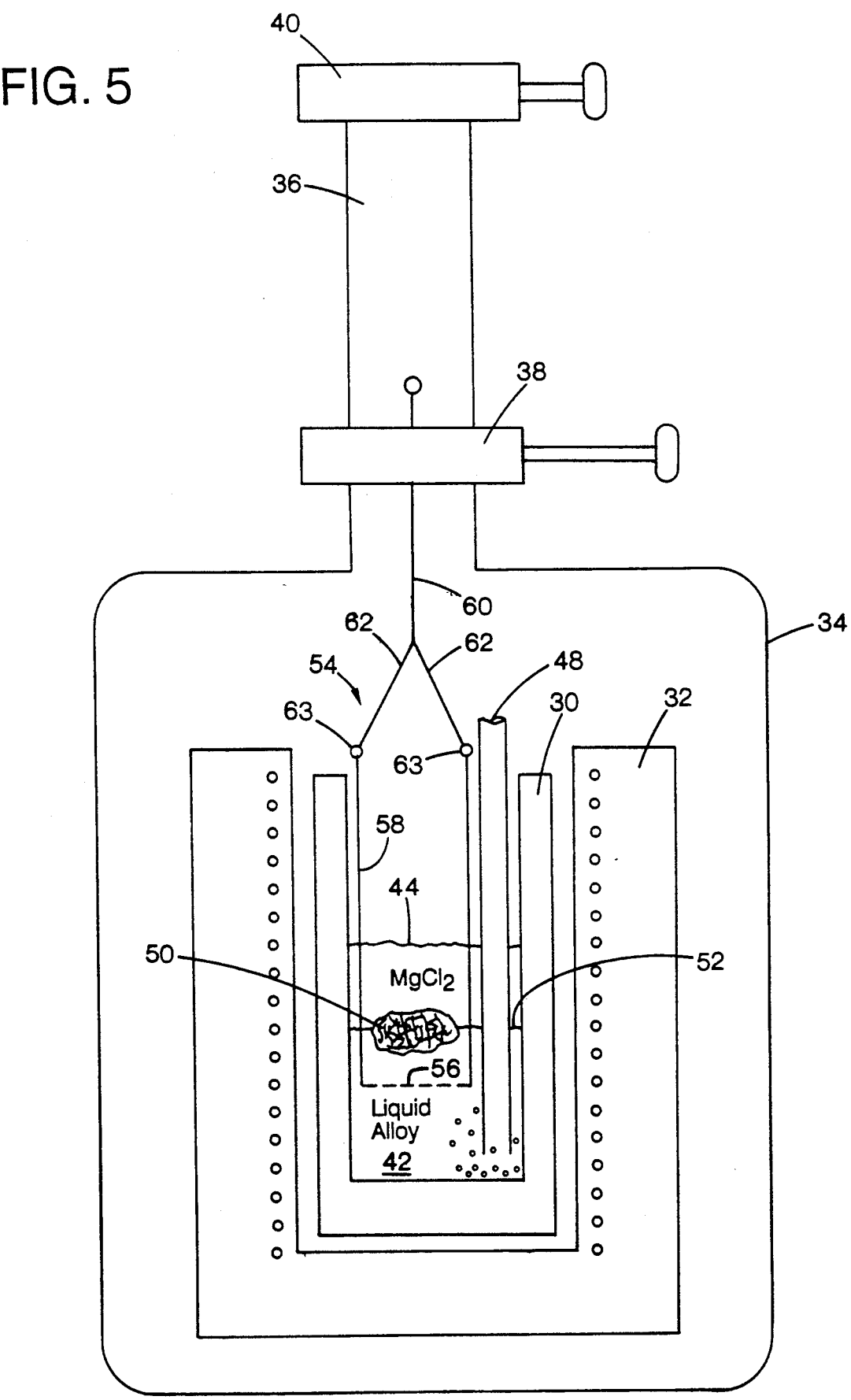
FIG. 5 is a schematic diagram of an alternative embodiment of the present invention for producing titanium powder.

A second embodiment of the invention is shown in FIG. 5 wherein a cylindrical crucible or reactor 30 is contained within and surrounded by a cylindrical furnace 32. Reactor 30 and furnace 32 for controlling the reaction temperature are both enclosed in a furnace chamber 34 which is filled with an inert gas such as argon or helium to provide an inert atmosphere for the reaction. Argon (at one atmosphere) is the preferred inert gas because of its low cost compared to helium. An inert atmosphere is desireable to prevent introducing impurities such as oxygen or nitrogen into the titanium which weaken the product and can make it brittle. An airlock chamber 36 communicates with furnace chamber 34 but is separated from it by a vacuum valve 38. A second vacuum valve 40 is interposed between airlock chamber 36 and the outside atmosphere.

As shown in FIG. 5, reactor 30 contains a lower layer 42 of zinc magnesium liquid alloy, and an upper layer 44 of liquid magnesium chloride which is produced as a by-product of the reaction in reactor 30. Titanium chloride vapor is introduced through conduit 48 into layer 42 to form a solid intermetallic compound which accumulates as dross 50 at the interface 52 of layers 42 and 44. A sieve basket 54 is suspended in reactor 30 to retrieve dross 50 periodically from the reactor. Basket 54 includes a perforated plate 56, imperforate cylindrical sidewall 58, and suspension hanger 60 for suspending basket 54 in the reactor. Arms 62 of hanger 60 are connected to the top of sidewall 58 by hinges 63 at several positions circumferentially around the top of the sidewall. Hanger 60 is connected to a conventional device (not shown) for raising or lowering sieve basket 54.

In operation, basket 54 is suspended in reactor 30 below the surface of layer 42 before $TiCl_4$ is introduced into the zinc magnesium liquid alloy. As $TiCl_4$ is introduced through conduit 48 into layer 42, titanium displaces magnesium from the zinc and the zinc titanium dross 50 forms at interface 52. After a predetermined period of time, or after a predetermined amount of dross 50 has accumulated, hanger 60 exerts an upward force on basket 54 to elevate the basket and move plate 56 upwardly. The liquids of layers 42 and 44 drain through perforated plate 56, while solid dross 50 is retained in basket 54 and removed from reactor 30. The ZnTi dross 50 is removed from the protective inert atmosphere of furnace chamber 34, and into airlock chamber 36 by opening vacuum valve 38, which allows basket 54 to enter airlock chamber 36. Vacuum valve 36 is then closed once again to protect the inert atmosphere in furnace chamber 34. Valve 40 is then opened to allow dross 50 to be removed from chamber 36 without contaminating the inert atmosphere of chamber 34.

Zinc and magnesium are replenished by introducing them through airlock chamber 36 into reactor 30. Accumulating magnesium chloride is also removed periodically from layer 44 through airlock chamber 36, either by a cup, siphon pipette, or overflow weir (not shown). Alternative methods for removing the dross (such as slurry pumping) would also be acceptable if oxidation of the product was prevented or diminished. The process is, therefore, quasi-continuous and efficient.

Figure 1:
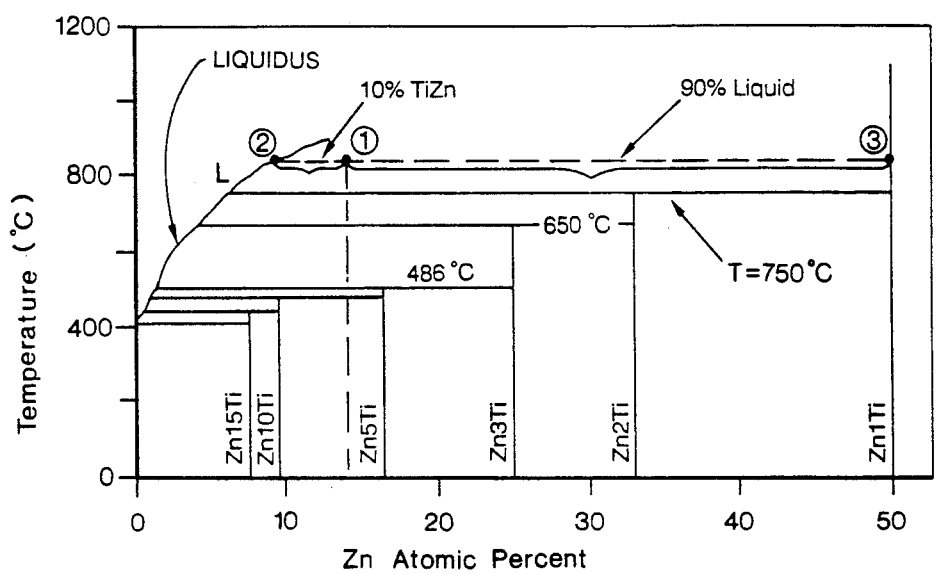
FIG. 1 is a zinc-titanium phase diagram.
Figure 2:
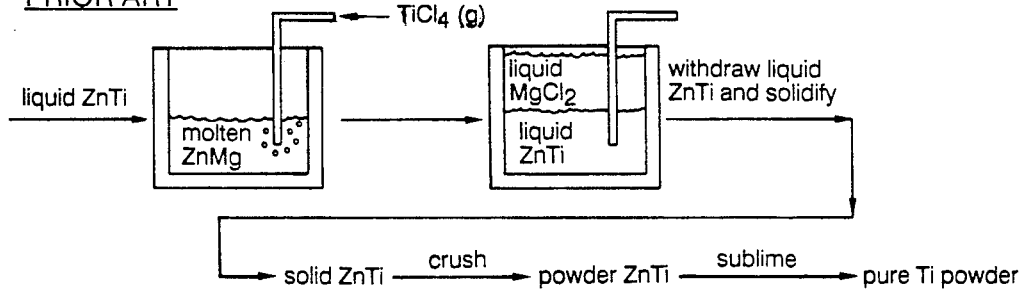
FIG. 2 is a schematic diagram of the prior art process disclosed in U.S. Pat. No. 4,602,947 for producing titanium sponge.

An advantage of the present invention is that it produces a zinc-titanium intermetallic compound having a high titanium content. The principle which permits the process to operate efficiently is illustrated in FIG. 1, which is a zinc-titanium phase diagram at one atmosphere. As the temperature rises upon heating, zinc melts at 419.5° C. and begins to dissolve titanium. The curve in FIG. 1 is the liquidus composition, which is the composition of zinc liquid saturated with dissolved titanium at the corresponding temperature, e.g., point 2 at about 830° C. At equilibrium point 2, zinc liquid is saturated with dissolved titanium. As further titanium is added, the excess dissolved titanium solute reacts with the zinc solvent to precipitate ZnTi crystals, with composition at point 3, from the melt in a liquid metal crystallization process. In the example shown in FIG. 1, an aggregate initial composition of about 13 atomic percent titanium, point 2 will yield equilibrium products that are solid TiZn and saturated liquid. The relative amounts are 90 percent liquid and 10 percent TiZn.

Above 650° C., the peritectic decomposition temperature of $Zn_3Ti$ is exceeded, and a mixture of only $Zn_2Ti$ and ZnTi are produced from the saturated liquid. The peritectic decomposition temperature of $Zn_2Ti$ is exceeded at about 750° C., and a pure ZnTi product is obtained at or above this temperature. The high vapor pressure of zinc renders difficult a precise determination of the peritectic decomposition temperature for $Zn_2Ti$. The present inventors have determined, however, that $Zn_2Ti$ will peritectically decompose to liquid ZnTi at a temperature below 800° C. and near 750° C.

A clear advantage of this invention is that $Zn_2Ti$ decomposes peritectically at a temperature at which the zinc vapor pressure is not excessively high. Moreover, when operating above the $Zn_2Ti$ peritectic temperature, the solubility of titanium in liquid zinc is very low (less than 10 atomic percent). In addition, the precipitation product ZnTi is very high in titanium (50 atomic percent, or about 42 weight percent). It is possible to continually introduce titanium into solution, letting it react with zinc to precipitate solid ZnTi, which can then be harvested as a dross. The process is performed above 650° C., which is the decomposition temperature of the peritectically decomposing $Zn_3Ti$ compound. Addition of excess titanium to a melt above this temperature will precipitate only $Zn_2Ti$ or ZnTi, because higher zinc intermetallic compounds such as $Zn_3Ti$ and $Zn_4Ti$ are unstable, will not form, and if present by addition would decompose peritectically to $Zn_2Ti$ or ZnTi and liquid. If the temperature of the melt is maintained above the peritectic decomposition temperature of $Zn_2Ti$ (about 750°), addition of excess titanium will precipitate only ZnTi because compounds containing higher atomic percents of Zn are unstable and will spontaneously decompose to ZnTi. Although operating temperatures above the peritectic decomposition temperature of $Zn_2Ti$ may cause operational difficulties, it does produce a product having a greater atomic percent of titanium. However, even the $Zn_2Ti$ product produced between 650° C. and about 750° C. has a much greater atomic percent of titanium than the liquid solutions of titanium produced by prior art processes.

Having illustrated and described the principles of the invention in two preferred embodiments, it should be apparent to those skilled in the art that the invention can be modified in arrangement and detail without departing from such principles.

We claim all modifications coming within the spirit and scope of the following claims.

1. A process for producing titanium, the process comprising:
   reacting zinc and a titanium halide in a reactor in the presence of a reducing agent to form a solid zinc-titanium product in the reactor;
   removing the solid zinc-titanium as a solid product from the reactor; and
   removing zinc from the titanium.

2. The process of claim 1, wherein the titanium is produced in a powder form by crushing the zinc-titanium product.

3. The process of claim 1, wherein the titanium halide is titanium tetrachloride.

4. The process of claim 1, wherein the zinc-titanium product is removed from the reactor before the zinc is removed from the titanium.

5. The process of claim 1, wherein the step of removing zinc from the titanium comprises distilling the zinc from the titanium.

6. The process of claim 1, wherein the zinc and titanium halide are reacted at 650°–907° C.

7. The process of claim 1, wherein the reducing agent is selected from the group consisting of magnesium, sodium, potassium, lithium, calcium, and mixtures thereof.

8. The process of claim 1, wherein the step of reacting zinc and a titanium halide comprises introducing titanium halide as a vapor into liquid zinc beyond the solubility limit of titanium in zinc to precipitate zinc-titanium intermetallic compounds.

9. The process of claim 1 wherein the step of reacting zinc and a titanium halide occurs in an inert gas environment.

10. The process of claim 1 wherein the zinc and titanium halide are reacted above the peritectic decomposition temperature of $Zn_3Ti$.

11. The process of claim 1 wherein the zinc and titanium halide are reacted above the peritectic decomposition temperature of $Zn_2Ti$.

12. The process of claim 6 wherein the zinc and titanium halide are reacted above 750° C.

13. The process of claim 7, wherein the reducing metal is magnesium.

14. The process of claim 8, wherein the step of reacting zinc and a titanium halide further comprises introducing the titanium halide vapor into liquid zinc at a temperature between 650°–907° C.

15. The process of claim 14 wherein the step of reacting zinc and a titanium halide further comprises introducing the titanium halide vapor into liquid zinc at a pressure of about one atmosphere.

16. A process for producing titanium, the process comprising:
    reacting zinc and a titanium halide in a reactor in the presence of a reducing agent to form a solid zinc-titanium product in the reactor, wherein the solid zinc-titanium product has a titanium content of at least 27 weight percent; and
    removing the solid zinc-titanium as a solid product from the reactor.

17. The process of claim 16, wherein the solid zinc-titanium product has a titanium content of greater than 40 weight percent.

18. A process for producing titanium powder, the process comprising:
    introducing titanium halide vapor into a liquid alloy of zinc and a reducing metal, beyond the solubility limit of titanium in zinc, at a temperature between 650°–907° C., to precipitate a zinc-titanium intermetallic compound in a reactor;
    removing the precipitate from the reactor and crushing it to form fine particles; and
    evaporatively separating the zinc from the fine particles to produce the titanium powder.

19. The process of claim 18, wherein the titanium halide is titanium tetrachloride.

20. The process of claim 18, wherein the zinc-titanium intermetallic product has a titanium content of at least 27 weight percent.

21. The process of claim 18, wherein the reducing metal is selected from the group consisting of magnesium, sodium, potassium, lithium, calcium, and mixtures thereof.

22. The process of claim 18, wherein the step of introducing titanium halide vapor into a liquid alloy of zinc and a reducing metal produces as a by-product a salt of the halide and reducing metal, which salt forms a salt layer separate from the liquid alloy, the method further comprising allowing the intermetallic compounds to accumulate at an interface between the liquid alloy and salt layer.

23. The process of claim 18, wherein the step of removing the precipitate from the reactor further comprises removing the precipitate from the interface in a basket.

24. The process of claim 18, wherein the step of introducing the titanium halide vapor into the liquid alloy occurs in an inert gas environment at about one atmosphere pressure.

25. The process of claim 20, wherein the zinc titanium intermetallic product has a titanium content of at least 40 weight percent.

26. The process of claim 21, wherein the reducing metal is magnesium.

27. A process for producing titanium powder, the process comprising:
    introducing titanium halide vapor into a liquid alloy of zinc and a reducing metal beyond the solubility limit of titanium in zinc to precipitate solid zinc-titanium intermetallic compounds and produce a liquid salt comprised of the reducing metal and a halide, which salt is immiscible with the liquid alloy and intermetallic compounds, the compounds forming and accumulating as a solid at an interface between the salt and liquid alloy;
    removing the solid from the interface;
    crushing the solid; and
    evaporatively separating the zinc from the crushed solid.

28. The process of claim 27 wherein the reducing metal is selected from the group consisting of magnesium, sodium, potassium, lithium, calcium, and mixtures thereof.

29. The process of claim 27 wherein the titanium halide vapor is introduced into the liquid alloy in a reactor at a temperature between 650°–907° C.

30. The process of claim 27 wherein the temperature is above the peritectic decomposition temperature of $Zn_3Ti$.

31. The process of claim 27 wherein the temperature is above the peritectic decomposition temperature of $Zn_2Ti$.

32. The process of claim 27 wherein the solid is removed from the interface in a basket.

33. The process of claim 27 wherein the solid has a titanium content of at least 27 weight percent.

34. The process of claim 27 wherein the titanium halide is titanium tetrachloride.

35. The process of claim 27 wherein the solid comprises $Zn_2Ti$ and $ZnTi$.

36. The process of claim 28 wherein the reducing metal is magnesium.

37. The process of claim 29 wherein the pressure in the reaction is about one atmosphere.

38. The process of claim 33 wherein the compound has a titanium content of at least 40 weight percent.

39. A process for producing titanium powder, the process comprising:

introducing titanium tetrachloride vapor into a liquid alloy of zinc and magnesium, at a temperature above the peritectic decomposition temperature of $Zn_3Ti$ in an inert atmosphere at a pressure of about one atmosphere, beyond the solubility limit of titanium in zinc to precipitate a zinc-titanium intermetallic compound and an immiscible liquid salt layer comprised of $MgCl_2$, the compound forming and accumulating at an interface between the salt layer and liquid alloy;

removing the compound from the interface; and evaporatively separating the zinc from the crushed compound.

40. The process of claim 39 wherein the temperature is above the peritectic decomposition temperature of $Zn_2Ti$.

* * * * *

UNITED STATES PATENT AND TRADEMARK OFFICE
CERTIFICATE OF CORRECTION

PATENT NO. : 5,176,741
DATED : January 5, 1993
INVENTOR(S) : Robert W. Bartlett et al.

It is certified that error appears in the above-identified patent and that said Letters Patent is hereby corrected as shown below:

On the title page, item [54], and in column 1, lines 1 and 2:
The title of the patent should read --PRODUCING TITANIUM PARTICULATES FROM IN SITU TITANIUM-ZINC INTERMETALLIC COMPOUND FORMATION--.

<u>In the Inventors ([75]):</u>

Inventor Kay D. Bowles' residence should read --Spokane, Washington--; inventor James J. Hemenway's residence should read --Veradale, Washington--.

Column 1, line 44, "resulting" should read --remelting--.

Column 3, line 12, "$Zn_2Ti$ and $Zn_2Ti$" should read --$Zn_2Ti$ and $ZnTi$--.

Column 4, line 25, "$(MgCl_3)$" should read --$(MgCl_2)$--.

Signed and Sealed this

Thirtieth Day of November, 1993

Attest:

BRUCE LEHMAN

Attesting Officer

Commissioner of Patents and Trademarks